Figure 1:
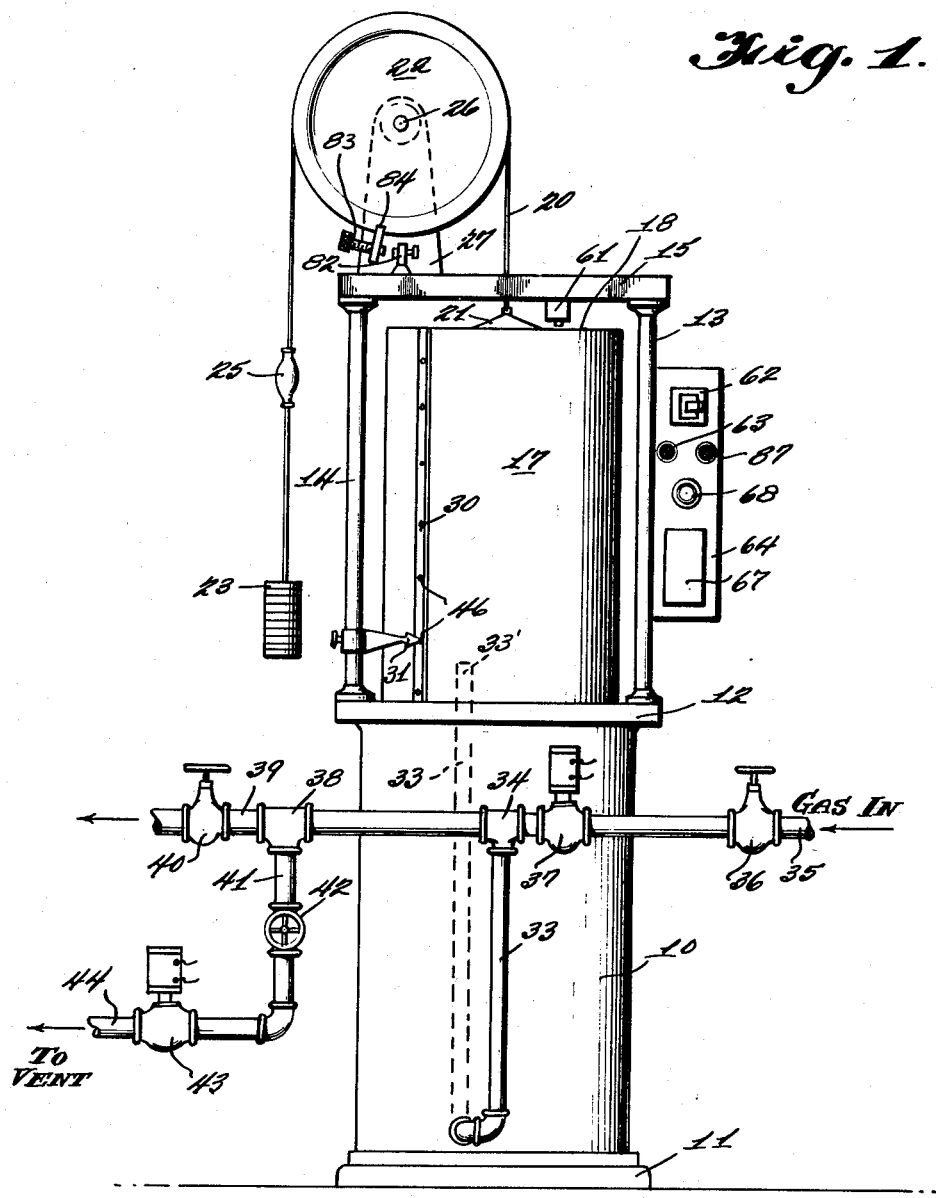

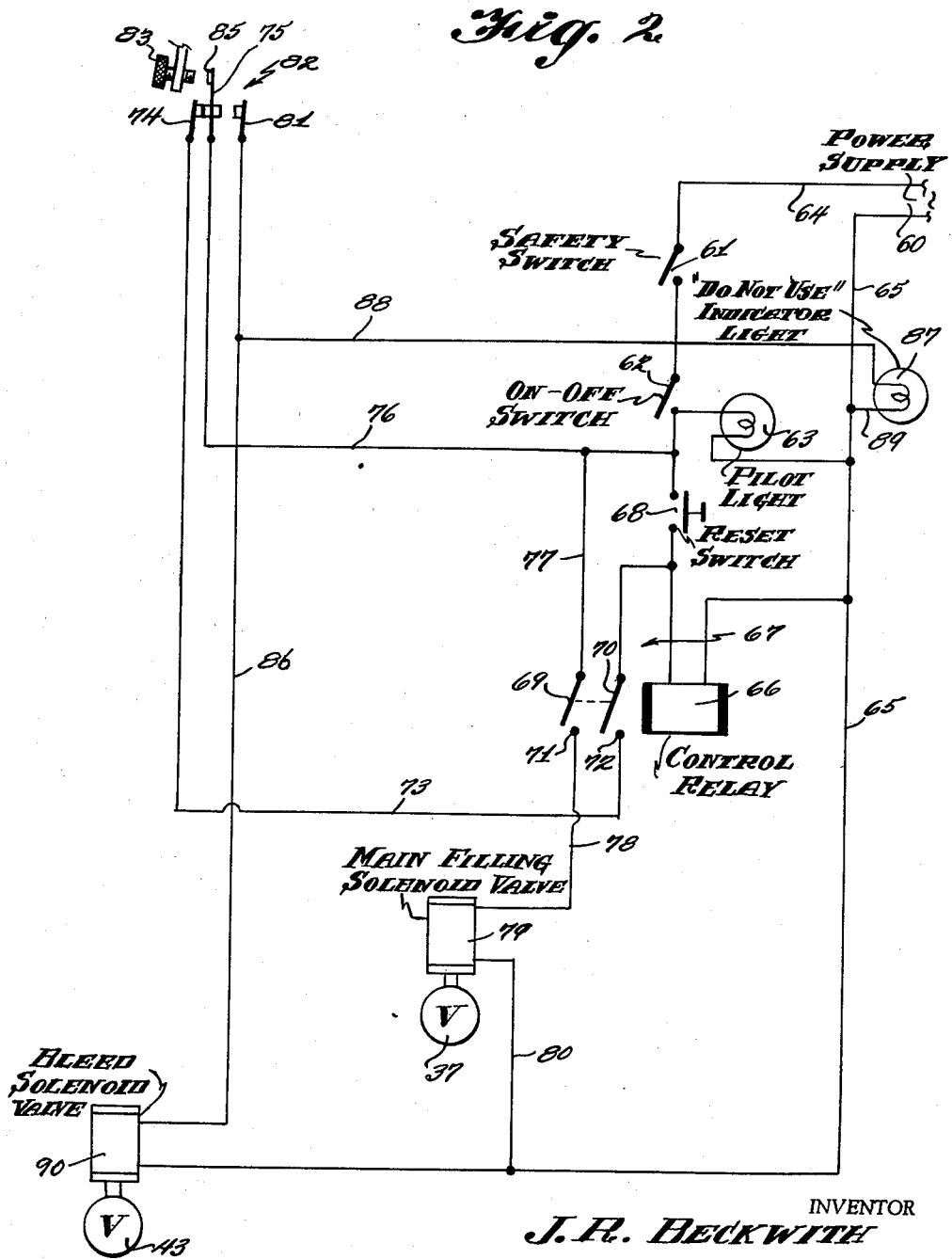

# United States Patent Office 2,934,939
Patented May 3, 1960

2,934,939
AUTOMATIC ZEROING CONTROLS FOR METER TEST DEVICES

John R. Beckwith, Fairfax, Va., assignor to Washington Gas Light Company, Washington, D.C., a corporation of the District of Columbia and Virginia Application June 21, 1957, Serial No. 667,112

6 Claims. (Cl. 73—3)

This invention relates to testing apparatus for, and methods of, testing volumetric displacement meters for use with fluids, and more particularly to apparatus referred to as a "prover bell" and methods of using the same.

It is a general object of the present invention to provide, in combination with a "prover bell" of conventional form, apparatus for automatically filling the bell accurately to a predetermined volume preparatory to conducting a meter test.

More particularly it is an object of the present invention to provide, in combination with a prover bell, means for supplying a quantity of fluid thereto in excess of the predetermined and desired volume and means to automatically vent the excess fluid to lower the bell to the position predetermined for the desired testing volume.

It is an important object of the present invention to arrange for automatically "zeroing" a prover bell following emptying of the same by operations initiated by the pressing of a start button.

Another important object of the invention consists in the electric circuit arrangements whereby a signal is given when the prover bell is fully zeroed for a meter test.

A further object of the invention consists in the provision of circuitry associated with the prover bell apparatus for carrying out the fully automatic operation of filling the bell beyond the desired point to insure adequate and rapid filling, then bleeding the excess volume and finally terminating the process when the exact desired quantity of gas is impounded and signalling to that effect, indicating readiness for a meter test.

Other and further objects and features of the invention will be more apparent to those skilled in the art upon a consideration of the accompanying drawings and following specification, wherein is disclosed a single exemplary embodiment of the invention, with the understanding that such changes and modifications may be made therein as fall within the scope of the appended claims without departing from the spirit of the invention.

In said drawings:

Fig. 1 is a front elevation of a prover bell fitted with the automatic filling, zeroing and signalling apparatus of the present invention; and Fig. 2 is a circuit diagram of electrical apparatus embodied in the construction and automatic operation of the prover bell of the present invention.

The testing of volumetric displacement meters and particularly those used in the measurement of natural and manufactured gas for domestic and industrial uses is generally effected by the passage through the meter of a predetermined volume of air or gas and a comparison of this volume with that registered by the meter mechanism. Such predetermined volume of measuring fluid is most effectively achieved from a so-called prover bell of known form comprising generally a cylinder closed at the top, open at the bottom and suspended, counterweighted and guided for vertical movement in a tank of water which latter acts as a relatively movable bottom for the cylindrical bell. A stationary pointer on the prover frame cooperates with a scale on the bell to indicate the volume of fluid therein at any adjusted immersed condition thereof.

Measuring fluid is introduced into the bell from a pipe rising through the surface of the water and this same pipe is preferably used to discharge the fluid for testing purposes. The bell is said to be "zeroed" or set at the zero point when filled with the desired quantity of measuring fluid prior to a test and the accuracy required for this consumes too much of the operator's time if done manually. The present invention as illustrated in the accompanying drawings performs the zeroing operation automatically thus freeing the operator for other tasks in connection with the tests and expedites the operation.

Reference should be had now to the drawings and particularly to Fig. 1 for a better understanding of the invention.

In that figure there is shown a more or less conventional prover bell of any desired capacity, including an open top cylindrical tank 10 having a base 11 adapted to be supported on a floor or like surface, the upper portion of the tank having a reinforced edge 12 from which extend a plurality of vertical columns 13, 14 for supporting the top frame 15 for purposes which will later appear.

The bell 17 of the prover is a cylindrical tube closed at the top 18, open at the bottom and adapted to slide freely within the tank 10, which latter is filled with water to nearly the top, whereby a chamber is formed in an airtight manner within the bell adjustable in size by raising or lowering it in respect to the level of the liquid in the tank 10. Suitable guides, not shown, are provided to insure centering the bell within the tank and are sufficiently free so as not to impede the movement thereof.

The bell is preferably suspended by means of a cable or chain 20 connected to the top thereof by any suitable means such as spreader wires 21. This chain or cable passes over a large diameter sheave 22 and supports a suitable counterweight which may be regulated in overall weight by the addition of individual weight units 23 thereto in a well known manner so that the total weight is just sufficiently less than that of the bell to permit the latter to fall of its own weight as the gas within it is exhausted and to provide the desired low pressure on the entrapped gas.

The sheave 22 is grooved on its outer periphery and is preferably also notched to cooperate with protuberances on the chain, which may be of the ball and wire type, to ensure constant positioning of the chain on the periphery thereof. The diameter of the sheave is greater than half the diameter of the tank 10 in order that the weights may fall freely outside of the tank as shown, a handle 25 being attached to the cable 20 above the weights for convenience in manually lifting the bell should this be desired.

The sheave 22 is journalled on a shaft 26 supported in suitably rigid bearing plates 27 secured to the top of frame 15 of the assembly.

The prover bell may be provided with a graduated and calibrated scale 30 adapted to cooperate with a pointer 31 which may be arranged to be adjustable along the standard 14 by means of the set screw as illustrated or other more positive and accurate means.

For filling the bell with the desired fluid used for measuring and testing, hereinafter called "gas" for convenience, a pipe 33 rises through the liquid and has its upper open end $33^1$ above the level thereof inside of the bell. This pipe passes through the wall of the tank near the bottom as shown and is fitted with an external riser 33 topped by a T 34, whereby it is connected to the incoming gas line 35, fitted first with a manual shut-off valve 36 and between this and the T with a normally closed solenoid filling valve 37.

Connected to the left part of T 34 by a short pipe is a second T 38, a straight extension 39 and a manually controlled discharge valve 40 for the delivery of testing gas from the bell. Dropping down from the T 38 is pipe 41, manual valve 42 and normally closed solenoid venting valve 43 leading to vent pipe 44 for discharging gas resulting from over-filling of the bell.

To fill the bell to the desired level the manual valve 36 is opened and with valves 43 and 40 closed the solenoid of valve 37 is energized and the valve thereby opened, whereby the entering gas under suitable pressure displaces the bell causing it to rise from its emptied lower position and when an appropriate quantity of gas has filled it, as indicated by the coincidence of the pointer 31 and a suitable graduation mark 46 on the scale, the valve 37 may be closed and the apparatus is ready to discharge a quantity of gas through the valve 40 to a meter being tested which is connected to the pipe beyond this valve. The quantity of gas delivered is dependent on the accuracy of setting at 46 and the accuracy of the stopping point on lowering the bell.

The problem of filling the bell 17 with the exact desired amount of gas to get the proper coincidence between the pointer 31 and the graduation mark 46 requires considerable of the operator's time. If the filling takes place rapidly, as it must to save time, there is apt to be over-filling and then a certain amount of the gas must be vented off. If filling is too slow or so slow as to permit proper coincidence of these parts then the operator's time taken to fill the bell is too long. In accordance with the present invention, therefore, the operation is wholly automatic following the initial touching of a button to start the cycle, and on reference to Fig. 2 an understanding of this will be had. An occasional manual adjustment of the pointer 31 may be required to compensate for temperature changes.

In the second figure of the drawing parts corresponding to those shown in Fig. 1 are given the same reference characters. Fig. 2 is a wiring diagram of the apparatus involved in rendering the filling of the bell to the zero position fully automatic. The circuit is supplied with electric power from any suitable source through the input leads 60 and in at least one of these there is provided a suitable safety switch 61 corresponding to that shown beneath the top frame member 15 (Fig. 1) in a position to be struck and opened by the bell should it be lifted higher than necessary. This ensures against damage should any of the controls fail. Beyond this switch 61 in the same side of the power supply line is a manual on/off switch 62 for placing the apparatus in condition for use, and just beyond this and bridged across the two sides of the line is a pilot light 63 to indicate when the apparatus is energized. This pilot light is shown mounted on the panel 64, carried by the column 13, in a position to be readily viewed by the operator. In a like manner the on/off switch 62 is arranged near the top of this panel.

Bridged across the main power wires 64 and 65 is the winding 66 of a control relay 67, and in series with this in line 64 is a momentary-contact push-button 68, sometimes referred to as a "reset switch."

The relay 67 which includes the coil 66, is of the double-pole, single-throw, spring-opened type so that the mechanically connected contact bars 69 and 70 normally do not engage their respective stationary contacts 71 and 72 until the winding 66 is energized by closing the reset switch. When this takes place two things happen, first the relay is closed and then locked up through its direct connection to line 65, through the winding 66, through contact bar 70 connected to line 64 on the winding side of button 68 which produces the closing. This engages stationary contact 72 connected with conductor 73, stationary contact 74, the movable contact on spring 75 and conductor 76 back to line 64 ahead of the reset switch. Thus release of this latter switch does not open the circuit to the control relay winding 66. The other contactor 69 closes the circuit from conductor 77, connected to conductor 76 and hence to line 64, through stationary contact 71 and wire 78 to the winding 79 of the main filling valve 37, the other side of the winding being connected by wire 80 to main conductor 65, whereby this solenoid is energized, valve 37 opened, and if the manual valve 36 has been opened, as it should have been at the beginning of the test, gas enters from line 35 through pipe 33 to fill the interior of the bell and raise the same.

The contact 74 and that on spring 75, previously referred to, and a third and stationary contact 81 are incorporated in the switch 82 shown mounted on the top of frame 15 in Fig. 1 in a position to be engaged by the tip of adjustable screw 83 extending through arm 84 radially mounted on the rim of the sheave 22. The screw 83 is adjusted to engage the insulated button 85 of the switch after the bell has risen slightly beyond the zero point, thereby assuring of adequate filling of the same with gas. Engagement of screw 83 with button 85 which is in control of spring arm 75 causes disengagement of contact 74 and that on spring 75, thereby opening the lock-up circuit for the control relay and permitting the latter to open, separating contacts 69 and 71 and de-energizes the main filling valve solenoid permitting the latter to close thus shutting off the supply of gas to the bell. Continued movement of the bell in the upward direction after separating contact 74 and that on spring 75 carries the latter into engagement with stationary contact 81, the whole amount of movement involved here being only several thousandths of an inch and being assured from the momentum of the bell and the volume of gas flowing into it.

Engagement of the contact on spring 75 and contact 81 energizes the solenoid bleed valve 43 through its winding 90, one side of which is connected directly to conductor 65 and the other through conductor 86 to contact 81, it being remembered that the contact on spring 75, now engaged by contact 81, is connected by conductor 76 to the other side 64 of the power line. Thus the bleed solenoid is energized and the small quantity of excess gas is vented, at a relatively slow rate, through vent valve 43, lowering the bell slowly until the contact on spring 75 and contact 81 separate. The switch 8 is a single-pole, double-throw one of the type commonly referred to as "micro-switch" wherein the movable arm snaps from engagement with one stationary contact to engagement with the other and cannot remain in a neutral position, so under the circumstances just described re-engagement between 74 and the contact on 75 takes place and the circuit for locking up the control relay is, to that extent, re-established, although the relay is at the moment open, and thus breaks the lock-up circuit at 70, 72.

Breaking the circuit between the contact on spring 75 and contact 81 de-energizes the solenoid of the bleed valve which promptly closes and stops movement of the bell, which if preliminary adjustments are carefully made, is now exactly "zeroed." The apparatus is now in condition for testing a meter, not shown, connected to the outlet from valve 40. With the meter pointer set at zero, valve 40 may be opened and a predetermined quantity of gas delivered from the bell 17 and this quantity, in known positive amount, as measured by the scale on the bell, then compared with the reading of the pointer or index hand on the meter to determine the accuracy of the latter.

During the operation of lowering the bell 17 from the over-filled position, during which time contact on spring 75 and contact 81 are engaged, the "Do Not Use" lamp 87, shown in both figures of the drawing, is lighted since this lamp is connected in parallel to the winding 90 of the bleed valve solenoid by conductors 88 and 89. Immediately on opening of the contact on spring 75 and contact 81, indicating correct zeroing of the bell, the lamp 87 goes out advising the operator that conditions are ready to begin the meter test.

At the completion of the meter test the valve 40 is closed and push button 68 again touched to initiate a repetition of the cycle just described. During the filling of the bell the operator can attend to exchanging meters, as connected beyond 40, since his time does not have to be devoted to watching and accurately zeroing the bell.

I claim:

1. In a prover bell having a counter-weighted bell movable up and down, respectively, in a tank of liquid on receipt and discharge of gas; in combination a source of electric power; a normally closed, solenoid, filler valve for controlling the delivery of gas to said bell; a normally closed, solenoid valve for controlling the venting of gas from said bell; means to overfill the bell beyond the zero mark, including a manually operable switch and means actuated thereby to energize a circuit for the first solenoid valve; a single-pole, double-throw, switch having one set of closed contacts in said circuit; means actuated by movement of said bell to open said set of contacts and close another; said second set of contacts being in the circuit between said second solenoid and said source; said last mentioned means being constructed and arranged to reclose the first set of contacts and open the second just as the bell, descending under the action of the vent valve, lowers to the "zero" mark; and means to prevent the reclosing of said first set of contacts from again energizing the first solenoid whereby the bell is ready for a meter test.

2. Apparatus for filling and zeroing a prover bell adapted to be filled through a normally closed solenoid filler valve; in combination a normally closed solenoid vent valve; a source of electric power; manual means to initiate the connection of said power to the solenoid filler valve; means actuated by the bell on filling beyond the "zero" point to transfer said power source to the second solenoid valve; said last mentioned means being arranged to de-energize the said second valve when the bell lowers to "zero"; and means initiated by the first actuation of said transfer means to open the circuit of the first valve against reenergization by said transfer means.

3. In a prover bell having normally closed, solenoid filler and vent valves for delivering and discharging gas from the bell of said prover; in combination a source of electric power; a normally open relay having two contactors; a momentary contact switch adapted to energize the relay coil from said source; a single-pole, double-throw switch positioned to be moved from normally closing a first circuit to closing a second when said bell rises above the "zero" mark therefor, one of said contactors being connected through said first circuit to energize said relay coil in shunt to said momentary contact switch, and the second being connected to energize said filler solenoid; means connecting said vent solenoid to be energized directly by the closing of said second circuit when the first is opened by the bell rising above "zero," such rising opening the relay coil circuit and both relay contactors; and means biasing said double-throw switch to return to closing said first circuit when the bell settles to "zero" under the action of said venting valve.

4. In a prover bell having a normally closed solenoid filler valve for delivering gas thereto, in combination; a source of electric power; a relay having a coil and two sets of normally open contacts; an open-biased switch for manual operation connected to energize said coil and close said contacts; one set of contacts being arranged to connect said source to said solenoid to open the valve and start to fill said bell; a holding circuit for said coil including said source and the second set of contacts; a normally biased-closed switch in the holding circuit; means actuated by bell position to open said last-mentioned switch when the bell is slightly overfilled to thereby open the relay holding circuit to prevent reclosing when the bell is lowered; a normally closed solenoid bleed valve; a circuit including the source, the solenoid of said bleed valve and a normally open switch; and means to close said last-mentioned switch substantially simultaneously with the opening of normally-closed switch in the holding circuit, whereby the bell starts to drop immediately.

5. The prover bell of claim 4 in which means is provided to terminate the lowering of the bell as the biased closed switch is reclosed and means to adjust said reclosing in respect to bell position whereby a predetermined quantity of gas remains in the bell.

6. In a prover bell having a tank; standards above the tank rim; a top frame supported by said standards; a sheave rotatively mounted above said frame; a cable passing over said sheave suspending a bell in said tank and a counterweight; a filler pipe for the bell and a source of gas, in combination, a normally closed solenoid filler valve between said source and filler pipe, a normally closed solenoid vent valve connected to said filler pipe, a source of electric power, a relay having contacts adapted to close a circuit to energize the filler valve solenoid and to lock up the relay, a momentary contact switch between said source of power and the relay magnet, a single-pole, double-throw, switch engageable by means dependent on bell position to open said relay lock circuit and the filler valve solenoid circuit when the bell is filled beyond its "zero" point, said single-pole switch being connected to close a circuit to energize said bleed valve to lower the bell when moved to open the relay lock circuit, the said double-throw switch being arranged to return to its first position when the bell lowers to the "zero" point to thereby close the bleed valve.

References Cited in the file of this patent

UNITED STATES PATENTS

| | | |
|---|---|---|
| 1,002,672 | Glover | Sept. 5, 1911 |
| 1,934,291 | Baas | Nov. 7, 1933 |
| 1,991,310 | Baas | Feb. 12, 1935 |
| 2,039,506 | Wagner et al. | May 5, 1936 |
| 2,448,616 | Oakley et al. | Sept. 7, 1948 |
| 2,555,730 | Burch | June 5, 1951 |
| 2,561,904 | Burch | July 24, 1951 |